US010334281B2

United States Patent
Zhang et al.

(10) Patent No.: US 10,334,281 B2
(45) Date of Patent: Jun. 25, 2019

(54) METHOD OF CONDITIONAL BINARY TREE BLOCK PARTITIONING STRUCTURE FOR VIDEO AND IMAGE CODING

(71) Applicant: MediaTek Singapore Pte. Ltd., Singapore (SG)

(72) Inventors: Kai Zhang, Beijing (CN); Jicheng An, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/742,420

(22) PCT Filed: Jul. 7, 2016

(86) PCT No.: PCT/CN2016/089106
§ 371 (c)(1),
(2) Date: Jan. 5, 2018

(87) PCT Pub. No.: WO2017/008678
PCT Pub. Date: Jan. 19, 2017

(65) Prior Publication Data
US 2018/0213264 A1    Jul. 26, 2018

(30) Foreign Application Priority Data

Jul. 15, 2015 (WO) ................ PCT/CN2015/084062

(51) Int. Cl.
*H04N 19/96* (2014.01)
*H04N 19/176* (2014.01)
(Continued)

(52) U.S. Cl.
CPC ........... *H04N 19/96* (2014.11); *H04N 19/119* (2014.11); *H04N 19/176* (2014.11); *H04N 19/70* (2014.11); *H04N 19/162* (2014.11)

(58) Field of Classification Search
CPC ....... H04N 19/00042; H04N 19/00763; H04N 19/00545
(Continued)

(56) References Cited

U.S. PATENT DOCUMENTS

2011/0310976 A1    12/2011  Wang et al.
2013/0148729 A1    6/2013   Sasai et al.
(Continued)

FOREIGN PATENT DOCUMENTS

CN    1589022 A      3/2005
CN    102118615      7/2011
(Continued)

OTHER PUBLICATIONS

International Search Report dated Oct. 13, 2016, issued in application No. PCT/CN2016/089106.
(Continued)

*Primary Examiner* — Anand S Rao
(74) *Attorney, Agent, or Firm* — McClure, Qualey & Rodack, LLP (57) ABSTRACT

A method and apparatus of block partition for video encoding or decoding for a video encoder or a video decoder respectively are disclosed. Partitioning tree structure corresponding to a conditional partitioning process is determined for partitioning the current block of video data into one or more final sub-blocks. The conditional partitioning process comprises a conditional binary partitioning process that uses at least a first constraint if a given block of the partitioning tree structure is partitioned into above and below blocks, or a second constraint if the given block of the partitioning tree structure is partitioned into left and right blocks. The below block is disallowed to be split into a lower-left and a lower-right block according to the first constraint, and the
(Continued)

right block is disallowed to be split into an upper-right block and a lower-right block according to the second constraint.

20 Claims, 5 Drawing Sheets

(51) Int. Cl.
*H04N 19/70* (2014.01)
*H04N 19/119* (2014.01)
*H04N 19/162* (2014.01)

(58) Field of Classification Search
USPC .................................. 375/240.01–240.29
See application file for complete search history.

(56) References Cited

U.S. PATENT DOCUMENTS

2015/0103906 A1* 4/2015 Zhao .................. H04N 19/46
 375/240.12
2015/0172716 A1 6/2015 Chen
2018/0007684 A1 1/2018 Nimbalker et al.

FOREIGN PATENT DOCUMENTS

| CN | 102118615 A | 7/2011 |
|---|---|---|
| CN | 102801976 A | 11/2012 |
| EP | 2 725 791 A1 | 4/2014 |
| RU | 2 517 404 C2 | 5/2014 |
| WO | 2013/106705 A2 | 7/2013 |
| WO | 2015/070801 A1 | 5/2015 |
| WO | 2016/091161 A1 | 6/2016 |

OTHER PUBLICATIONS

Kim,I.K, et al.; "Block Partitioning Structure in the HEVC Standard;" IEEE Transactions on Circuits and Systems for Video Technology; vol. 22; No. 12; Dec. 2012; pp. 1697-1706.

* cited by examiner

METHOD OF CONDITIONAL BINARY TREE BLOCK PARTITIONING STRUCTURE FOR VIDEO AND IMAGE CODING

CROSS REFERENCE TO RELATED APPLICATIONS

The present invention claims priority to PCT Patent Application, Serial No. PCT/CN2015/084062, filed on Jul. 15, 2015. The PCT Patent Application is hereby incorporated by reference in its entirety.

TECHNICAL FIELD

The invention relates generally to image and video processing. In particular, the present invention relates to block partitioning structure with restrictions to reduce or remove redundancy associated with the block partitioning structure in video and image coding.

BACKGROUND

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

Figure 1:
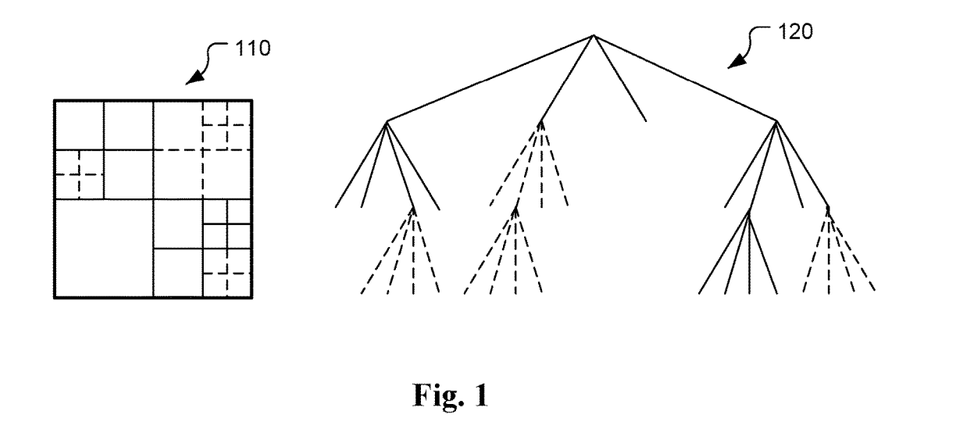
FIG. 1 illustrates the subdivision of a CTU into CUs and TUs using a corresponding quadtree in HEVC (high efficiency video coding).

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU or can be split into four smaller units of equal sizes (i.e., M/2×M/2), which are nodes of coding tree. If units are leaf nodes of coding tree, the units become CUs. Otherwise, the quadtree splitting process can be iterated until the size for a node reaches a minimum allowed CU size as specified in the SPS. This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

Figure 2:
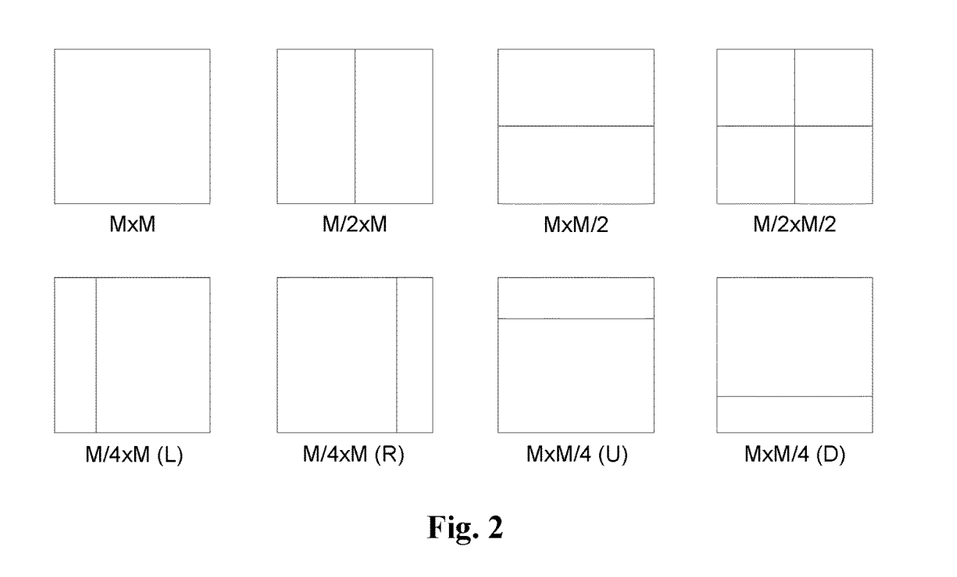
FIG. 2 illustrates the eight partition types for splitting a CU (coding unit) into one or more PUs (prediction units) in HEVC (high efficiency video coding).

One or more prediction units (PU) are specified for each CU. Coupled with the CU, the PU works as a basic representative block for sharing the prediction information. Inside each PU, the same prediction process is applied and the relevant information is transmitted to the decoder on a PU basis. A CU can be split into one, two, or four PUs according to the PU splitting type. HEVC defines eight shapes for splitting a CU into PU as shown in FIG. 2. Unlike the CU, the PU may only be split once. The partitions shown in the second row correspond to asymmetric partitions, where the two partitioned parts have different sizes.

After obtaining the residual block by applying the prediction process based on the PU splitting type, a CU can be partitioned into transform units (TUs) according to another quadtree structure, which is analogous to the coding tree for the CU. In FIG. 1, the solid lines in block 110 indicate CU boundaries, and dotted lines in block 110 indicate TU boundaries. Similarly, the solid lines for the partition tree structure 120 corresponds to the CU partition tree structure and the dashed lines for the partition tree structure 120 corresponds to the TU partition tree structure. The TU is a basic representative block of residual or transform coefficients for applying the integer transform and quantization. For each TU, one integer transform with the same size is applied to the TU to obtain residual coefficients. These coefficients are transmitted to the decoder after quantization on a TU basis.

The terms, coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU.

The tree partitioning is generally applied simultaneously to both the luma and chroma components, although exceptions may apply when certain minimum sizes are reached for the chroma component.

However, due to some restrictions of the current HEVC block partitioning structure, the coding efficiency may not be sufficient to cope with the ever increasing demands for larger storage and transmission of video contents. The restrictions of the current HEVC block partitioning structure exist in the quadtree based partitioning from CTU to CU and from CU to TU and the limited depth of PU partitioning.

A binary tree structure has been disclosed by some common inventors for partitioning a unit into multiple smaller units, such as partitioning a slice into CTUs, a CTU into CUs, a CU into PUs, or a CU into TUs in the PCT Patent Application, No. PCT/CN2015/096761.

Figure 3:
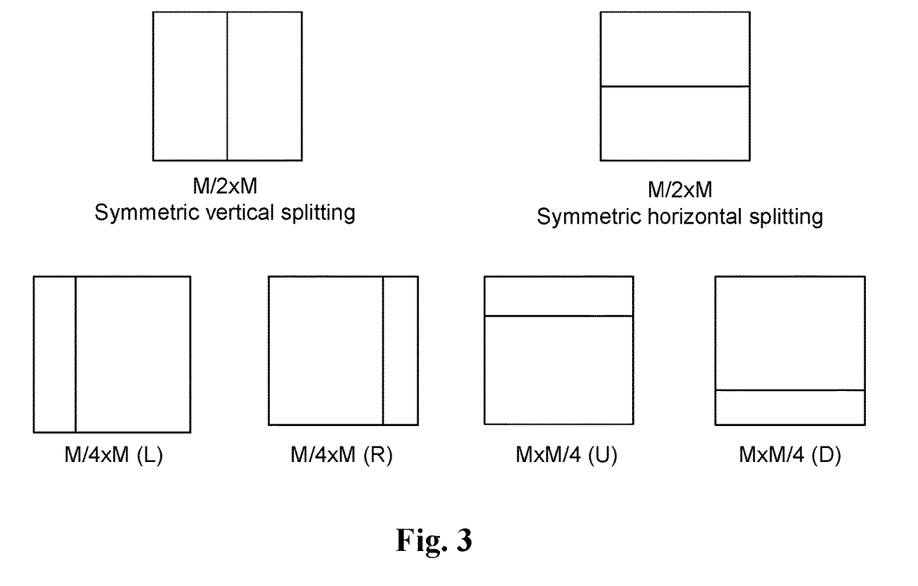
FIG. 3 illustrates the possible splitting types for a binary tree.

In the binary tree partitioning structure as disclosed in the PCT Patent Application, No. PCT/CN2015/096761, a block can be recursively split into two smaller blocks. There are various binary splitting types as shown in FIG. 3. The simplest ones are the symmetric horizontal and vertical split as shown in the top row of the splitting types in FIG. 3. Therefore, in one embodiment of the PCT Patent Application, No. PCT/CN2015/096761, only these two splitting types are used for binary splitting. For a given block of size M×N, a flag is signalled to indicate whether a block is split into two smaller blocks. If yes, another syntax element is signalled to indicate which splitting type is used. If the horizontal splitting is used then it is split into two blocks of size M×N/2. Otherwise, it is vertical split into two blocks of size M/2×N.

Figure 4:
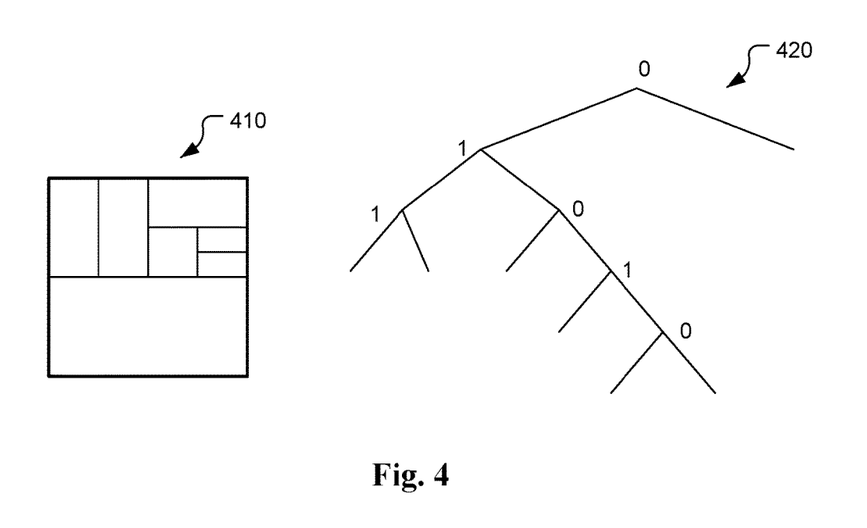
FIG. 4 illustrates an example of block partition using a corresponding binary tree.

The binary tree splitting process can be iterated until the size (i.e., width or height) for a splitting block reaches a minimum allowed block size. The minimum allowed block size can be defined in high level syntax such as SPS (sequence parameter set). Since the binary tree has two splitting types (i.e., horizontal and vertical), the minimum allowed block width and height should be both indicated. Non-horizontal splitting is implicit when splitting would result in a block height smaller than the indicated minimum. Non-vertical splitting is implicit when splitting would result in a block width smaller than the indicated minimum. FIG. 4 illustrates an example of block partitioning 410 and its corresponding binary tree structure 420. In each splitting (i.e., non-leaf) node of the binary tree structure, one flag is used to indicate which splitting type (i.e., horizontal or vertical) is used, where 0 indicates horizontal splitting and 1 indicates vertical splitting.

The proposed binary tree structure can be used for partitioning a block into multiple smaller blocks such as partitioning a slice into CTUs, a CTU into CUs, a CU into PUs, or a CU into TUs, and so on. In one embodiment, the binary tree is used for partitioning a CTU into CUs. In other words, the root node of the binary tree is a CTU and the leaf nodes of the binary tree are CUs. The leaf nodes are further processed by prediction and transform coding. In another embodiment, there is no further partitioning from CU to PU or from CU to TU to simplify the block partitioning process. That means the CU is equal to the PU and also equal to TU. Therefore, the leaf nodes of the binary tree are also the basic unit for prediction and transform coding in this case.

The binary tree structure is more flexible than the quadtree structure, since the binary tree structure allows more partition shapes, which is also the source of coding efficiency improvement. However, the encoding complexity will also increase due to the increased selections for choosing the best partition shape. In order to balance between the complexity and coding efficiency, the PCT Patent Application, No. PCT/CN2015/096761 discloses a method to combine the quadtree and binary tree structure, which is called as quadtree plus binary tree (QTBT) structure. In an exemplary QTBT structure, a block is firstly partitioned by a quadtree structure, and the quadtree splitting can be iterated until the size for a splitting block reaches the minimum allowed quadtree leaf node size. If the leaf quadtree block is not larger than the maximum allowed binary tree root node size, it can be further partitioned by a binary tree structure. The binary tree splitting can be iterated until the size (i.e., width or height) for a splitting block reaches the minimum allowed binary tree leaf node size (i.e., width or height) or the binary tree depth reaches the maximum allowed binary tree depth.

Figure 5:
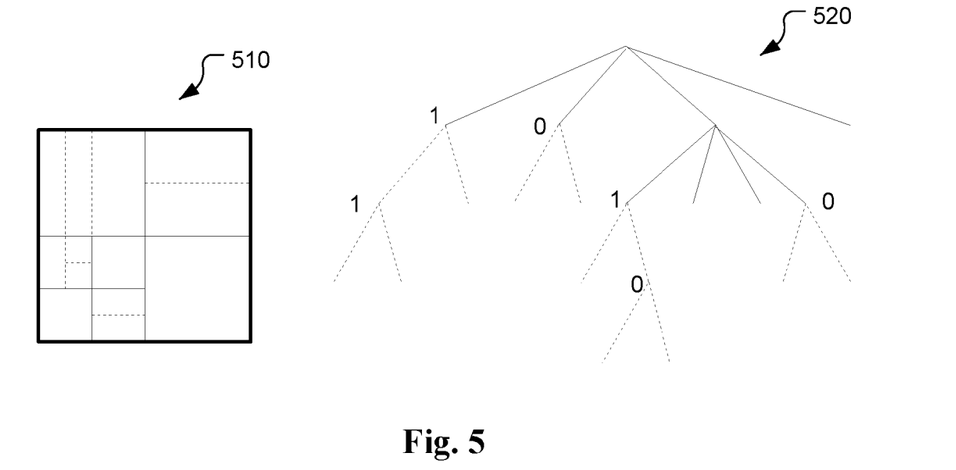
FIG. 5 illustrates an example of block partition using a corresponding quadtree plus binary tree (QTBT).

In the QTBT structure, the minimum allowed quadtree leaf node size, the maximum allowed binary tree root node size, the minimum allowed binary tree leaf node width and height, and the maximum allowed binary tree depth can be indicated in a high level syntax such as the SPS. FIG. 5 illustrates an example of block partitioning 510 and its corresponding QTBT structure 520. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting.

The QTBT structure can be used for partitioning a block into multiple smaller blocks, such as partitioning a slice into CTUs, a CTU into CUs, a CU into PUs, or a CU into TUs, and so on. In one embodiment of the PCT Patent Application, No. PCT/CN2015/096761, the QTBT is used for partitioning a CTU into CUs, where the root node of the QTBT is a CTU that is partitioned into multiple CUs by a QTBT structure. The CUs are further processed by prediction and transform coding. To simplify the partition process, there is no further partitioning from CU to PU or from CU to TU. This implies that each CU is equal to a PU as well as a TU. In other words, the leaf node of the QTBT structure is the basic unit for prediction and transform.

To illustrate an example of the QTBT structure, system parameters are set as follows: a CTU with size 128×128, the allowed quadtree leaf node size equal to 16×16, the maximum allowed binary tree root node size equal to 64×64, the minimum allowed binary tree leaf node width and height both equal to 4, and the maximum allowed binary tree depth equal to 4. Firstly, the CTU is partitioned by a quadtree structure and the leaf quadtree unit may have size from 16×16 (i.e., the minimum allowed quadtree leaf node size) up to 128×128 (i.e., CTU size with no split). If the leaf quadtree unit is 128×128, it cannot be further split by binary tree since the size exceeds the maximum allowed binary tree root node size, 64×64. Otherwise, the leaf quadtree unit can be further split by binary tree, and each leaf quadtree unit is also the root binary tree unit and has binary tree depth as 0. When the binary tree depth reaches 4 (i.e., the indicated maximum), no further splitting is implicit. Accordingly, when the binary tree node has width equal to 4, non-horizontal splitting is implicit, and when the binary tree node has height equal to 4, non-vertical splitting is implicit. The leaf nodes of the QTBT are further processed by prediction (e.g. Intra-picture or Inter-picture prediction) and transform coding.

The tree structure is applied separately to luma and chroma for I slice, and applied simultaneously to both luma and chroma for P- and B-slice except when certain minimum sizes are reached for the chroma component. In other words, in an I-slice, the luma CTB has its QTBT block partitioning, and the two chroma CTBs has another QTBT block partitioning. However, the two chroma CTBs can also have their own QTBT block partitioning.

Figure 6A:
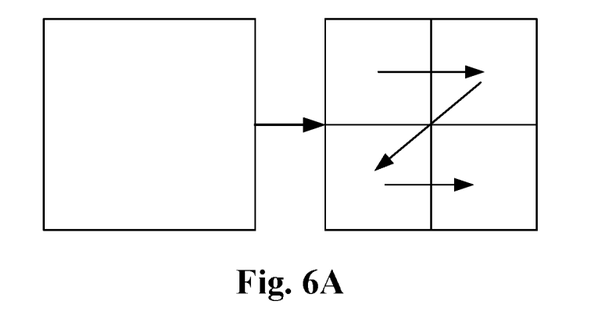
FIGS. 6A-6C illustrate examples of redundant coding structure through different splitting paths.
Figure 6B:
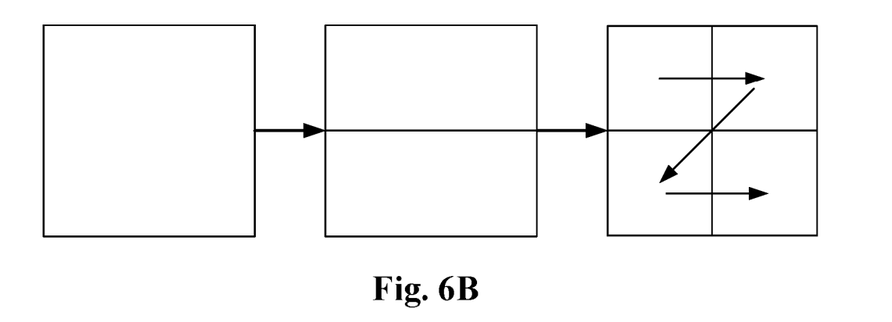
Figure 6C:
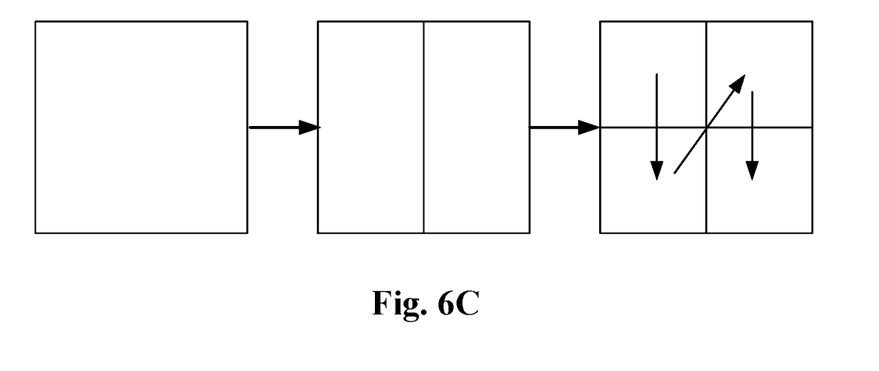

While the QTBT structure provides more flexibility, it may introduce some redundant structures. FIG. 6A through FIG. 6C illustrate examples of redundant structures. In FIG. 6A, a block is split into 4 sub-blocks directly using quad-partition. In FIG. 6B, a block is split into an above block and a below block using horizontal binary partition, and each block is further split into a left block and a right block using vertical binary partition. In FIG. 6C, a block is split into a left block and a right block using vertical binary partition, and each block is further split into an above block and a below block using horizontal binary partition. All splitting paths in FIG. 6A through FIG. 6C result in the same partitions, i.e., four sub-blocks.

SUMMARY

A method and apparatus of block partition for video encoding or decoding for a video encoder or a video decoder respectively are disclosed. In one embodiment, a partitioning tree structure corresponding to a conditional partitioning process is determined for partitioning the current block of video data into one or more final sub-blocks. The conditional partitioning process comprises a conditional binary partitioning process that uses at least a first constraint if a given block of the partitioning tree structure (e.g., the current block) is partitioned into an above block and a below block, or a second constraint if the given block of the partitioning tree structure is partitioned into a left block and a right block. The below block is disallowed to be split into a first lower-left block and a first lower-right block according to the first constraint, and the right block is disallowed to be split into a second upper-right block and a second lower-right block according to the second constraint. An encoding or decoding process comprising prediction process, transform process or both is then applied to the current block of video data by applying the encoding or decoding process at a level corresponding to the final sub-blocks.

At the video encoder side, the partitioning tree structure is determined by the video encoder and information associated with the partitioning tree structure is signalled from the video encoder to a video decoder. At the video decoder side, the partitioning tree structure is determined by the video decoder based on information associated with the partitioning tree structure signalled in a bitstream. The conditional binary partitioning process can be applied to the given block recursively to generate binary tree leaf nodes belonging to said one or more final sub-blocks.

In one embodiment, if both quad-partition and binary partition are allowed for the given block of the partitioning tree structure, the conditional binary partitioning process may use both first constraint and the second constraint. In another embodiment, if only binary partition is allowed for the given block of the partitioning tree structure, the conditional binary partitioning process uses only the first constraint or the second constraint. When the conditional binary partitioning process uses the second constraint, a flag can be signalled for the left block to indicate whether the left block is split into a second upper-left block and a second lower-left block, and no flag is signalled for the right block to indicate whether the right block is split into the second upper-right block and the second lower-right block. Similarly, when the conditional binary partitioning process uses the first constraint, one flag is signalled for the above block to indicate whether the above block is split into a first upper-left block and a first upper-right block, and no flag is signalled for the below block to indicate whether the below block is split into the first lower-left block and the first lower-right block.

Whether the conditional binary partitioning process uses the first constraint, the second constraint or both can be based on a slice type of a current slice covering the current block of video data. For example, the conditional binary partitioning process uses only the first constraint or the second constraint if the current slice is a P-slice or B-slice, and the conditional binary partitioning process uses neither the first constraint nor the second constraint if the current slice is an I-slice. In another example, the conditional binary partitioning process uses only the first constraint or the second constraint if the current slice is an I-slice, and the conditional binary partitioning process uses neither the first constraint nor the second constraint if the current slice is a P-slice or B-slice.

Whether the conditional binary partitioning process uses the first constraint, the second constraint or both can be based on a colour component type of the current block of video data. For example, the conditional binary partitioning process uses only the first constraint or the second constraint if the current block of video data is a luma component, and the conditional binary partitioning process uses neither the first constraint nor the second constraint if the current block of video data is a chroma component. In another example, the conditional binary partitioning process uses only the first constraint or the second constraint if the current block of video data is a chroma component, and the conditional binary partitioning process uses neither the first constraint nor the second constraint if the current block of video data is a luma component.

At least one flag can be signalled in VPS (video parameter set), SPS (sequence parameter set), PPS (picture parameter set), slice header, or CU (coding unit) to indicate whether the first constraint, the second constraint, or both is included for the conditional binary partitioning process.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Figure 7:
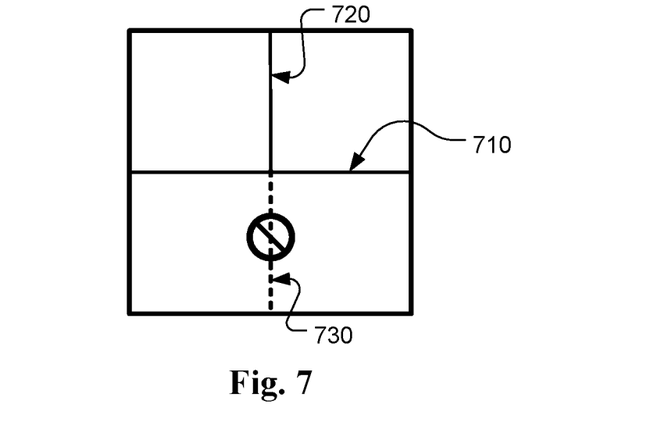
FIG. 7 illustrates an example of un-allowed partitioning in a below 2N×N block according to an embodiment of the present invention.

As mentioned above, there is some redundancy in a coding system incorporating block partitioning including binary partitioning. Especially, for the quadtree plus binary tree (QTBT) structure, redundancy exists that may cause loss in coding efficiency. In order to address the redundancy issue in a system using binary tree structure, especially the QTBT structure, methods to remove or reduce redundancy in the binary tree structure are disclosed. In one embodiment, when a block is split into an above block and a below block using horizontal binary partition (partition 710) and the above block is split into a left block and a right block using vertical binary partition (partition 720), then the below block is not allowed to be split into a left block and a right block (partition 730 is not allowed). This constraint is named constraint I or first constraint in this disclosure as illustrated in FIG. 7. For example, when a current block is partitioned into an above block and a below block, the first constraint is used if the above block is split into an upper-left block and an upper-right block.

Figure 8:
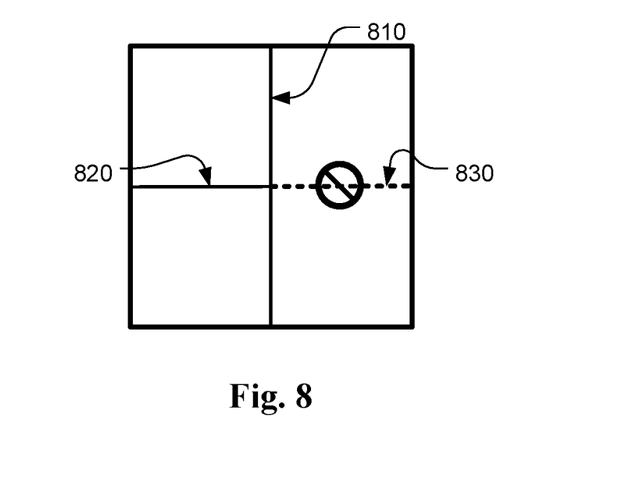
FIG. 8 illustrates an example of not allowed partitioning in a right N×2N block according to an embodiment of the present invention.

In another embodiment, when a block is split into a left block and a right block using vertical binary partition (partition 810) and the left block is split into an above block and a below block using horizontal binary partition (partition 820), then the right block is not allowed to be split into an above block and a below block (partition 830 is not allowed). This constraint is named constraint II or second constraint in this disclosure as illustrated in FIG. 8. For example, when a current block is partitioned into a left block and a right block, the second constraint is used if the left block is split into an upper-left block and a lower-left block.

There are various ways to apply constraint I and constraint II adaptively depending on the block to be partitioned. For example, when a block can be split into either four or two sub-blocks (i.e., both quad-partition and binary partition are allowed for this block), both constraint I and constraint II are applied. In another example, when a block can only be split into two sub-blocks (i.e., only binary partition is allowed for this block), constraint I is applied and constraint II is not applied. In yet another example, when a block can only be split into two sub-blocks, constraint II is applied and constraint I is not applied.

When constraint I is applied, only one flag is signalled to indicate the splitting mode for the above block since there is no need to signal for the below block (according to constraint I, the below block is disallowed to be split into a lower-left block and a lower-right block). The flag indicates whether the above block is not split, or is further split into an upper-left block and an upper-right block. Similarly, when constraint II is applied, only one flag is signalled to indicate the splitting mode for the left block. The flag indicates whether the left block is not split, or is further split into an upper-left block and a lower-left block. No flag is needed for indicating the splitting mode for the right block, since the right block is disallowed to be split into an upper-right block and a lower-right block according to the constraint II. In this embodiment, the flag for the vertical/horizontal split in the forbidden case is saved.

In one embodiment, whether the two constraints are applied or not depend on the slice type. For example, constraint I can be applied for the P/B-slice, but not for the I-slice. In this example, constraint I is used for the block in the P/B-slice, but is not used for the block in the I-slice. In yet another example, constraint II can be applied for the P/B-slice, but not for the I-slice. In this example, constraint II is used for the block in the P/B-slice, but is not used for the block in the I-slice. The constraint I can also be applied for the I-slice, but not for the P/B-slice. Similarly, constraint II can be applied for the I-slice, but not for the P/B-slice.

In another embodiment, whether the two constraints are applied or not depend on the colour component. For example, constraint I can be applied for the luma component, but not for the chroma component. In this example, constraint I is used for the luma block, but is not used for the chroma block. In another example, constraint II can be applied for the luma component, but not for the chroma component. In this example, constraint II is used for the luma block, but is not used for the chroma block. The constraint I may also be applied for the chroma component, but not for the luma component. Similarly, constraint II can be applied for the chroma component, but not for the luma component.

In one embodiment, a flag is signalled from the encoder to the decoder to indicate whether constraint I is applied. The flag can be signalled in VPS (video parameter set), SPS (sequence parameter set), PPS (picture parameter set), slice header, or CU. Similarly, a flag may be signalled from the encoder to the decoder to indicate whether constraint II is applied. The flag can be signalled in VPS, SPS, PPS, slice header, or CU. In another example, a flag may be signalled from the encoder to the decoder to indicate whether both of constraint I and constraint II are applied.

Figure 9:
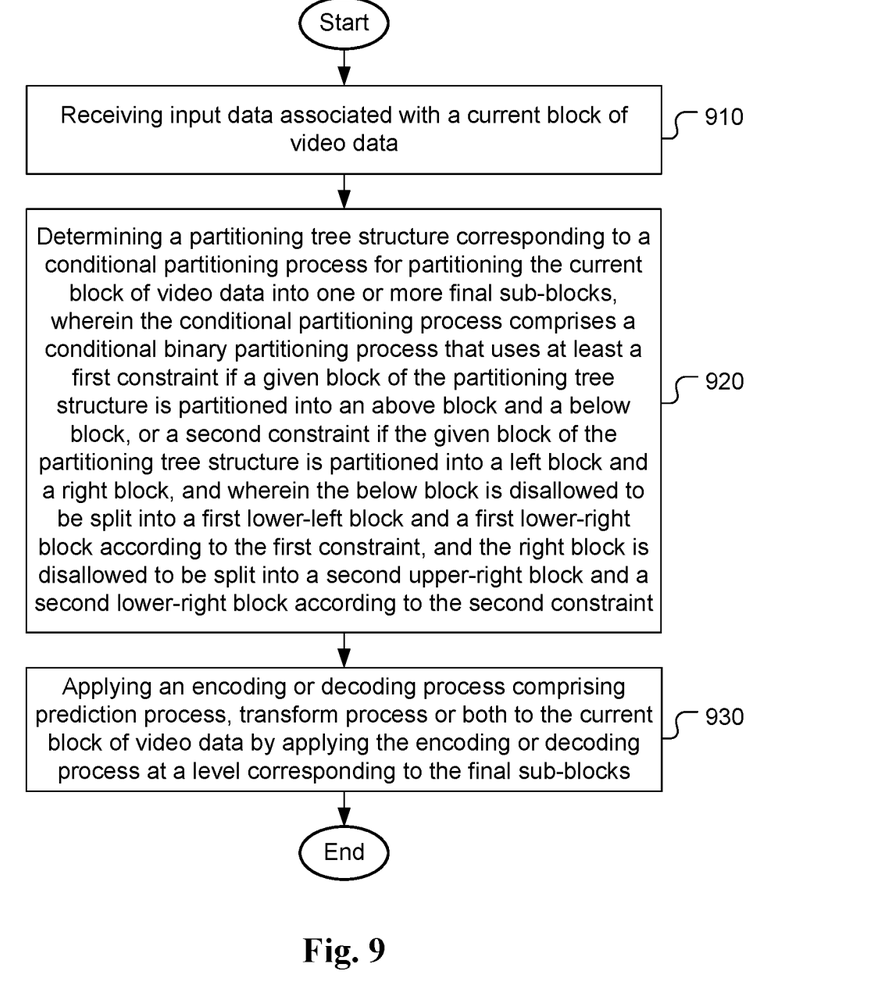
FIG. 9 illustrates a flowchart for an exemplary coding system incorporating conditional binary partitioning according to an embodiment of the present invention.

FIG. 9 illustrates a flowchart for an exemplary coding system incorporating conditional binary partitioning according to an embodiment of the present invention. Based on this method, input data associated with a current block of video data is received in step 910. In the encoder side, the input data may correspond to pixel data to be coded or predicted or residual data to be processed by transform. In the decoder side, the input data correspond to coded transform data to be inverse-transformed or coded pixel data to be decoded or to be predicted. The partitioning tree structure corresponding to a conditional partitioning process for partitioning the current block of video data into one or more final sub-blocks is determined in step 920. In the encoder side, the encoder determines the partitioning tree structure based on, for example, the attribute of the video data and signals the information associated therewith in the bitstream. In the decoder side, the decoder can determines the partitioning tree structure based on the information associated with the partitioning tree structure signalled in the bitstream. The conditional partitioning process comprises a conditional binary partitioning process that uses at least a first constraint if a given block of the partitioning tree structure (e.g., the current block) is partitioned into an above block and a below block, or a second constraint if the given block of the partitioning tree structure (e.g., the current block) is partitioned into a left block and a right block. The below block is disallowed to be split into a lower-left block and a lower-right block according to the first constraint, and the right block is disallowed to be split into a upper-right block and a lower-right block according to the second constraint. The conditional binary partitioning process is applied to the given block (e.g., the current block) recursively to generate binary tree leaf nodes belonging to the final sub-blocks. The encoding or decoding process comprising prediction process, transform process or both are applied to the current block of video data by applying the encoding or decoding process at a level corresponding to the final sub-blocks as shown in step 930.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of block partitioning for video encoding or decoding for a video encoder or a video decoder respectively, the method comprising:
   receiving input data associated with a current block of video data;
   determining a partitioning tree structure corresponding to a conditional partitioning process for partitioning the current block of video data into one or more final sub-blocks, wherein the conditional partitioning process comprises a conditional binary partitioning process that uses at least a first constraint if a given block of the partitioning tree structure is partitioned into an above block and a below block, or a second constraint if the given block of the partitioning tree structure is partitioned into a left block and a right block, and wherein the below block is disallowed to be split into a first lower-left block and a first lower-right block according to the first constraint, and the right block is disallowed to be split into a second upper-right block and a second lower-right block according to the second constraint; and
   applying an encoding or decoding process comprising prediction process, transform process or both to the current block of video data by applying the encoding or decoding process at a level corresponding to the final sub-blocks.

2. The method of claim 1, wherein said determining the partitioning tree structure is performed by the video encoder and information associated with the partitioning tree structure is signalled from the video encoder to the video decoder.

3. The method of claim 1, wherein said determining the partitioning tree structure is performed by the video decoder based on information associated with the partitioning tree structure signalled in a bitstream.

4. The method of claim 1, wherein the conditional binary partitioning process is applied to the given block recursively to generate binary tree leaf nodes belonging to said one or more final sub-blocks.

5. The method of claim 1, wherein if both quad-partition and binary partition are allowed for the given block of the partitioning tree structure, the conditional binary partitioning process uses both the first constraint and the second constraint.

6. The method of claim 1, wherein if only binary partition is allowed for the given block of the partitioning tree structure, the conditional binary partitioning process uses only the first constraint or uses only the second constraint.

7. The method of claim 1, wherein when the conditional binary partitioning process uses the second constraint, one flag is signalled for the left block to indicate whether the left block is split into a second upper-left block and a second lower-left block, and no flag is signalled for the right block to indicate whether the right block is split into the second upper-right block and the second lower-right block.

8. The method of claim 1, wherein when the conditional binary partitioning process uses the first constraint, one flag is signalled for the above block to indicate whether the above block is split into a first upper-left block and a first upper-right block, and no flag is signalled for the below block to indicate whether the below block is split into the first lower-left block and the first lower-right block.

9. The method of claim 1, wherein whether the conditional binary partitioning process uses the first constraint, the second constraint or both is based on a slice type of a current slice covering the current block of video data.

10. The method of claim 9, wherein the conditional binary partitioning process uses the first constraint or the second constraint if the current slice is a P-slice or B-slice, and wherein the conditional binary partitioning process uses neither the first constraint nor the second constraint if the current slice is an I-slice.

11. The method of claim 9, wherein the conditional binary partitioning process uses the first constraint or the second constraint if the current slice is an I-slice, and wherein the conditional binary partitioning process uses neither the first constraint nor the second constraint if the current slice is a P-slice or B-slice.

12. The method of claim 1, wherein whether the conditional binary partitioning process uses the first constraint, the second constraint or both is based on a colour component type of the current block of video data.

13. The method of claim 12, wherein the conditional binary partitioning process uses the first constraint or the second constraint if the current block of video data is a luma component, and wherein the conditional binary partitioning process uses neither the first constraint nor the second constraint if the current block of video data is a chroma component.

14. The method of claim 12, wherein the conditional binary partitioning process uses the first constraint or the second constraint if the current block of video data is a chroma component, and wherein the conditional binary partitioning process uses neither the first constraint nor the second constraint if the current block of video data is a luma component.

15. The method of claim 1, wherein at least one flag is signalled in VPS (video parameter set), SPS (sequence parameter set), PPS (picture parameter set), slice header, or CU (coding unit) to indicate whether the first constraint, the second constraint, or both the first and second constraints are included for the conditional binary partitioning process.

16. The method of claim 1, wherein the conditional binary partitioning process uses the first constraint if the above block is split into a first upper-left block and a first upper-right block.

17. The method of claim 1, wherein the conditional binary partitioning process uses the second constraint if the left block is split into a second upper-left block and a second lower-left block.

18. An apparatus for block partitioning for video encoding or decoding performed by a video encoder or a video decoder respectively, the apparatus comprising one or more electronic circuits or a processor configured to:
   receive input data associated with a current block of video data;
   determine a partitioning tree structure corresponding to a conditional partitioning process for partitioning the current block of video data into one or more final sub-blocks, wherein the conditional partitioning process comprises a conditional binary partitioning process that uses at least a first constraint if a given block of the partitioning tree structure is partitioned into an above block and a below block, or a second constraint if the given block of the partitioning tree structure is partitioned into a left block and a right block, and wherein the below block is disallowed to be split into a first lower-left block and a first lower-right block according to the first constraint, and the right block is disallowed to be split into a second upper-right block and a second lower-right block according to the second constraint; and apply an encoding or decoding process comprising prediction process, transform process or both to the current block of video data by applying the encoding or decoding process at a level corresponding to the final sub-blocks.

19. The apparatus of claim 18, wherein if both quad-partition and binary partition are allowed for the given block of the partitioning tree structure, the conditional binary partitioning process uses both the first constraint and the second constraint.

20. The apparatus of claim 18, wherein if only binary partition is allowed for the given block of the partitioning tree structure, the conditional binary partitioning process uses only the first constraint or only the second constraint.

* * * * *